(12) United States Patent
Shin (10) Patent No.: US 10,663,019 B2
(45) Date of Patent: May 26, 2020

(54) NON-POWERED PASSIVE BRAKING DEVICE USING CENTRIFUGAL FORCE

(71) Applicant: CHUNGANG UNIVERSITY INDUSTRY-ACADEMIC COOPERATION FOUNDATION, Seoul (KR)

(72) Inventor: Dong Jun Shin, Seoul (KR)

(73) Assignee: CHUNGANG UNIVERSITY INDUSTRY—ACADEMIC COOPERATION FOUNDATION, Seoul (KR)

( * ) Notice: Subject to any disclaimer, the term of this patent is extended or adjusted under 35 U.S.C. 154(b) by 6 days.

(21) Appl. No.: 16/075,382

(22) PCT Filed: Jul. 27, 2016

(86) PCT No.: PCT/KR2016/008187
§ 371 (c)(1),
(2) Date: Aug. 3, 2018

(87) PCT Pub. No.: WO2017/135530
PCT Pub. Date: Aug. 10, 2017

(65) Prior Publication Data
US 2019/0040920 A1 Feb. 7, 2019

(30) Foreign Application Priority Data
Feb. 5, 2016 (KR) .......................... 10-2016-0014913

(51) Int. Cl.
*F16D 43/18* (2006.01)
*F16D 51/22* (2006.01)
(Continued)

(52) U.S. Cl.
CPC ............. *F16D 51/22* (2013.01); *F16D 59/00* (2013.01); *F16D 63/00* (2013.01); *F16D 51/18* (2013.01);
(Continued)

(58) Field of Classification Search
CPC .......... F16D 13/02; F16D 43/06; F16D 43/08; F16D 51/22; E02B 7/20
(Continued)

(56) References Cited

U.S. PATENT DOCUMENTS 2,970,680 A * 2/1961 Cain ....................... F16D 43/18
192/105 CD
3,576,242 A * 4/1971 Mumma .............. B65G 13/075
193/35 A
(Continued)

FOREIGN PATENT DOCUMENTS

JP 05-106658 A 4/1993
JP 2012-036944 A 2/2012
(Continued)

OTHER PUBLICATIONS

International Search Report of PCT/KR2016/008187 dated Nov. 7, 2016.

*Primary Examiner* — Christopher P Schwartz
(74) *Attorney, Agent, or Firm* — Sughrue Mion, PLLC (57) ABSTRACT

The present invention relates to an unpowered braking device using centrifugal force. The present invention may comprise: a housing; a brake drum installed inside the housing; a plurality of braking links rotatably installed on a rotating shaft of the housing and connected such that both ends thereof can expand and contract by means of centrifugal force; brake rollers provided on both ends of the braking links, respectively, such that, when the braking links expand, the brake rollers are forced against the inner walls of the
(Continued)

brake drums and thereby generate braking force/torque; and an elastic member for providing elastic force such that both ends of the braking links, which have expanded, can contract.

9 Claims, 8 Drawing Sheets

(51) Int. Cl.
*F16D 59/00* (2006.01)
*F16D 63/00* (2006.01)
F16D 51/18 (2006.01)
F16D 65/08 (2006.01)
F16D 65/10 (2006.01)
F16D 121/14 (2012.01)
F16D 127/00 (2012.01)
F16D 129/04 (2012.01)

(52) U.S. Cl.
CPC .............. *F16D 65/08* (2013.01); *F16D 65/10* (2013.01); *F16D 2121/14* (2013.01); *F16D 2127/002* (2013.01); *F16D 2129/043* (2013.01)

(58) Field of Classification Search
USPC .............. 188/184–186, 74, 78; 192/105 BA, 192/105 CD; 193/35 A
See application file for complete search history.

(56) References Cited

U.S. PATENT DOCUMENTS

| | | | | |
|---|---|---|---|---|
| 3,971,462 A | * | 7/1976 | Johansson | F16D 43/18 |
| | | | | 192/105 BA |
| 4,195,721 A | * | 4/1980 | Shea | F16D 43/22 |
| | | | | 188/184 |
| 4,231,237 A | * | 11/1980 | Bochan | D06F 37/36 |
| | | | | 192/105 CD |
| 4,282,953 A | * | 8/1981 | Lichti | B66D 5/04 |
| | | | | 188/189 |
| 4,800,996 A | * | 1/1989 | Loizeau | F16D 13/68 |
| | | | | 192/103 B |
| 4,819,779 A | * | 4/1989 | Nickel | B27B 17/10 |
| | | | | 192/105 BA |
| 6,457,569 B2 | * | 10/2002 | Draper | B66B 5/04 |
| | | | | 187/351 |

FOREIGN PATENT DOCUMENTS

| | | |
|---|---|---|
| KR | 10-0939790 B1 | 2/2010 |
| KR | 10-1215286 B1 | 12/2012 |
| KR | 10-1552300 B1 | 9/2015 |

* cited by examiner

NON-POWERED PASSIVE BRAKING DEVICE USING CENTRIFUGAL FORCE

CROSS REFERENCE TO RELATED APPLICATIONS

This application is a National Stage of International Application No. PCT/KR2016/008187 filed Jul. 27, 2016, claiming priority based on Korean Patent Application No. 10-2016-0014913 filed Feb. 5, 2016.

TECHNICAL FIELD

The present invention relates to a non-powered passive braking device using a centrifugal force, and more specifically, to a non-powered passive braking device using a centrifugal force which may compensate for gravity using a centrifugal force, have low inertia, bi-directionally perform braking, and control a braking velocity.

BACKGROUND ART

An active braking device is widely used to control a joint angular velocity. However, the active braking device has problems in which the system is complex and a complex controller is additionally required.

In contrast, a passive braking device is superior to the active braking device in terms of weight, compactness, energy efficiency, and responsiveness. Further, since the passive braking device is inherently safe, a complex fail-safe framework is not required. Generally, the passive braking device using a centrifugal force is used in a seat belt, an elevator, a fishing rod, and the like.

Since functions of most passive braking devices are affected by a direction of gravity, it is hard to apply the passive braking device to robots with a high degree of freedom. Further, since mechanism of the conventional passive braking device is heavy and bulky, and braking torque thereof is applied only in one direction, the passive braking device has a problem in being applied to a multi-body dynamic system. In addition, since a spring structure of the passive braking device is not completely independent with respect to a direction of gravity, the performance of the passive braking device is affected by gravity when used in a joint of the robot, and thus the development of a passive braking device having a structure capable of compensating for gravity is needed.

Technical Problem

The present invention is directed to providing a non-powered passive braking device using a centrifugal force which may compensate for gravity using a centrifugal force, have low inertia, bi-directionally perform braking, and have a structure capable of controlling a braking velocity.

Technical Solution

One aspect of the present invention provides a non-powered passive braking device using a centrifugal force which includes a housing, a brake drum installed in the housing, a plurality of brake links rotatably mounted on a rotating shaft of the housing and connected with each other so that both ends thereof are expanded or contracted by a centrifugal force, brake rollers provided at both ends of the brake links and, when the brake links are expanded, coming into close contact with an inner wall of the brake drum so as to generate a braking force, and an elastic member configured to provide an elastic force so that the both expanded ends of the brake links are contracted.

The non-powered passive braking device using a centrifugal force may further include a central member rotatably mounted on the rotating shaft of the housing, and brake plates mounted at a front surface and a rear surface of the central member, wherein the brake rollers are rotatably provided between both ends thereof.

The brake link may include a pair of central plates mounted at an outer side of the brake plate and disposed to cross each other, and four side plates connected with both ends of the pair of central plates by link pins and having both ends rotatably connected with each other.

The brake links may be coupled with each other by coupling pieces having both ends coupled with the side plates.

A roller shaft of the brake roller may move along braking slots formed in both ends of the brake plate.

The braking slot may have a T-shape and include an initial part in which the roller shaft is positioned when acceleration starts in a stopped state, and a braking part extending from the initial part in both directions and communicating therewith and allowing the roller shaft to be locked at one side thereof at a braking velocity.

The braking slot may include the initial part in which the roller shaft is positioned when acceleration starts in a stopped state, and the braking part extending obliquely from a perpendicular axis of the initial part and communicating therewith and allowing the roller shaft to be locked at one side thereof at a braking velocity.

The central member may have adjusting members coupled to both sides thereof through adjusting screws, and the elastic member may be fitted onto an outer surface of the adjusting screw so that an elastic force of the elastic member is adjusted when the adjusting screw is adjusted.

One end of the elastic member may be supported in each of supporting grooves formed in both sides of the central member, and the other end thereof may be supported by the adjusting member.

The elastic member may be provided as a compression spring to provide an elastic force so that a compressed state is returned to an original state when both ends of the brake links are expanded.

Advantageous Effects

According to an embodiment of the present invention, a non-powered passive braking device using a centrifugal force can compensate for gravity using a centrifugal force, have low inertia, bi-directionally perform braking, and have a structure capable of controlling a braking velocity.

MODES OF THE INVENTION

Exemplary embodiments of the present invention will be illustrated in the accompanying drawings and described in detail in the written description, but the embodiments may be changed and have many alternative forms. However, the present invention is not limited to particular modes of practice, and it should be appreciated that all changes, equivalents, and substitutes not departing from the spirit and technical scope of embodiments are encompassed in the embodiments. In the description of the embodiments, certain detailed descriptions of the related art will be omitted when it is deemed that the detailed descriptions unnecessarily obscure the essence of the inventive concept.

Although the terms first, second, etc. are used to describe various components, the components are not limited by the terms. The terms are used to only to distinguish one component from another.

The terminology used herein is for the purpose of describing particular embodiments only and is not intended to limit the present invention. As used herein, the singular forms are intended to include the plural forms as well unless clearly indicated otherwise by context. It should be further understood that the terms "comprises" and/or "includes" specify the presence of stated features, integers, steps, operations, elements, and/or components when used herein, but do not preclude the presence or addition of one or more other features, integers, steps, operations, elements, components, and/or groups thereof.

Hereinafter, embodiments of a non-powered passive braking device using a centrifugal force according to the present invention will be described in detail with reference to the accompanying drawings. When describing the present invention with reference to the accompanying drawings, the same or similar elements are designated with the same numeral references, and redundant descriptions thereof will be omitted.

Figure 1:
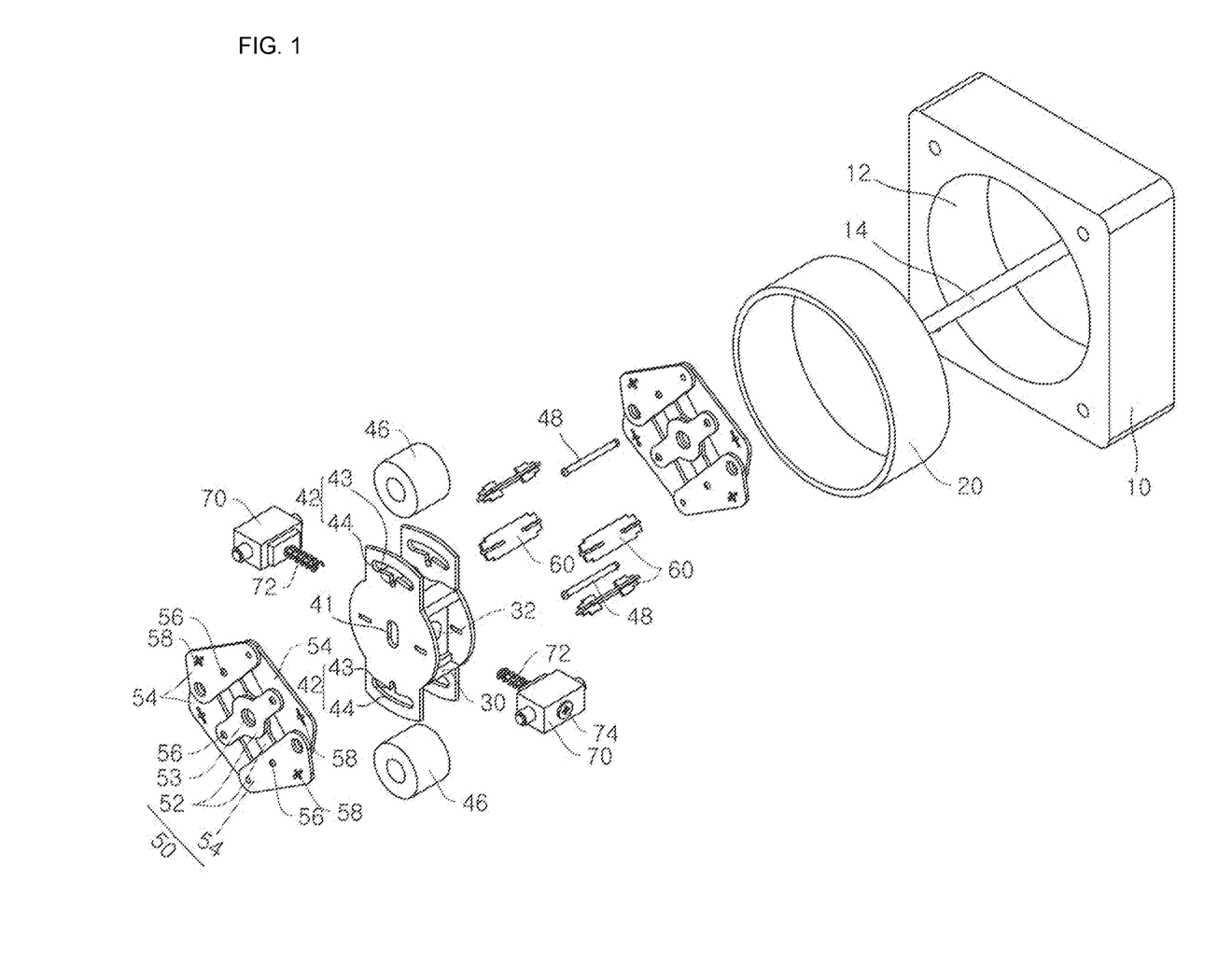
FIG. 1 is an exploded perspective view of a non-powered passive braking device using a centrifugal force according to one embodiment of the present invention.
Figure 2:
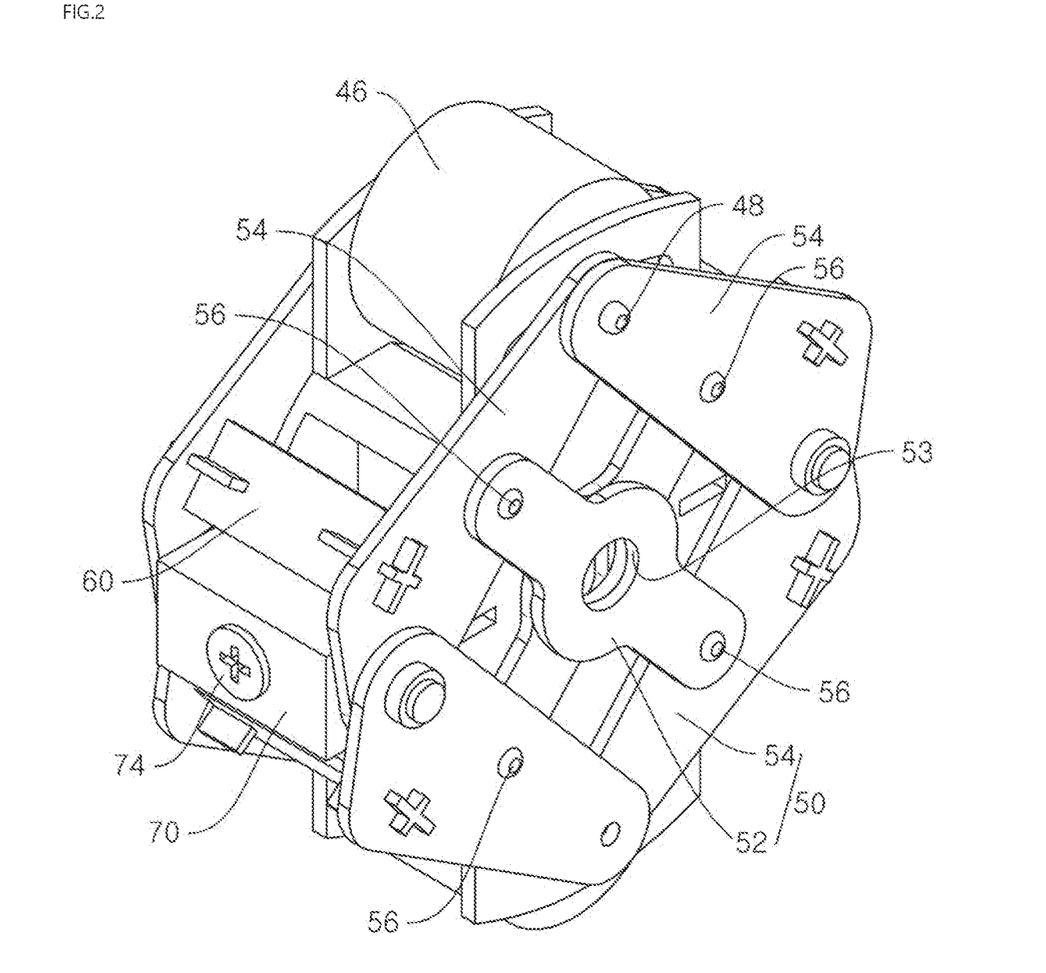
FIG. 2 is a perspective view showing the assembled non-powered passive braking device using a centrifugal force according to one embodiment of the present invention.

FIG. 1 is an exploded perspective view of a non-powered passive braking device using a centrifugal force according to one embodiment of the present invention, and FIG. 2 is a perspective view showing the assembled non-powered passive braking device using a centrifugal force according to one embodiment of the present invention.

As shown in FIGS. 1 and 2, the non-powered passive braking device using a centrifugal force according to the embodiment of the present invention includes a housing 10, a brake drum 20 mounted in the housing 10, a plurality of brake links 50 rotatably mounted on a rotating shaft 14 of the housing 10 and connected with each other so that both ends thereof are expanded or contracted by a centrifugal force, brake rollers 46 provided at both ends of the brake links 50 and, when the brake links 50 are expanded, come into close contact with an inner wall of the brake drum 20 to generate a braking force, and an elastic member 72 providing an elastic force so that the expanded ends of the brake links 50 are contracted.

The housing 10 forms an exterior of the non-powered passive braking device using a centrifugal force and is formed in an approximately rectangular parallelepiped shape. The housing 10 includes a drum accommodating part 12 in which the brake drum 20 is formed to have a shape corresponding to a shape of the brake drum 20. The rotating shaft 14 is formed to extend a predetermined length forward from the center of the drum accommodating part 12. The rotating shaft 14 is connected to a motor and generates power while rotating when the motor is driven.

A central member 30 with a predetermined thickness is rotatably mounted on the rotating shaft 14. Supporting grooves 32 into which ends of the elastic members 72 are inserted to be supported therein are formed in both ends of the central member 30. Therefore, the elastic member 72 may provide an elastic force while both ends of the elastic member 72 are supported by the adjusting member 70 described below and the supporting grooves 32.

Brake plates 40 are mounted on a front surface and a rear surface of the central member 30. A through hole 41 through which the rotating shaft 14 passes is formed in the center of the brake plate 40, and the brake plate 40 is provided to practically perform braking while a roller shaft 48 of the brake roller 46 is locked by the brake plate 40.

Thus, braking slots 42 in which the roller shafts 48 are movable are formed in both ends of the brake plate 40. The braking slot 42 has a T-shape and may include an initial part 43 in which the roller shaft 48 is positioned when acceleration starts in a stopped state, and a braking part 44 extending from the initial part 43 in both directions and communicating therewith and allowing the roller shaft 48 to be locked at one side thereof at a braking velocity. That is, the roller shaft 48 is positioned at one end of the initial part 43 in a stopped state and moves along the initial part 43 by a centrifugal force when rotation is started. When rotation is performed at a joint angular velocity greater than a predetermined joint angular velocity and braking is required, the roller shaft 48 escapes from the initial part 43 and moves toward the braking part 44. The roller shaft 48 is locked at one side of the braking part 44, and the brake roller 46 comes into close contact with an inner wall of the brake drum 20, and thus braking is activated.

In this case, the braking slot 42 has a T-shape, and the braking part 44 extends in both directions, and thus braking is easily activated in a bidirectional operation.

The roller shaft 48 functions as a pin for connecting side plates 54 described below. The brake rollers 46 are provided at portions corresponding to both ends of the brake links 50, and thus braking is possible not only in one direction but also in both directions.

Meanwhile, the brake links 50 are mounted at outer sides of the brake plates 40, that is, at a front surface of the brake plate 40 disposed at the front side of the central member 30 and a rear surface of the brake plate 40 disposed at the rear side thereof. In the embodiment of the present invention, the brake link 50 includes six members. More specifically, the brake link 50 may include a pair of central plates 52 rotatably mounted on the rotating shaft 14 of the housing 10 and disposed to cross each other, and four side plates 54 connected with both ends of the pair of central plates 52 by link pins 56 and having both ends rotatably connected with each other.

The coupled brake links 50 are formed in an appropriately rhombus shape by the side plates 54, and both ends of the rhombus shape are expanded or contracted when accelerating or decelerating according to driving of the motor. The six members are rotatably connected with each other so that the brake links 50 may organically move about the rotating shaft 14.

A structure of the above-described brake link 50 allows the brake rollers 46 provided at both ends of the brake link 50 to control braking while the brake rollers 46 move in both directions, and thus the braking device can perform compensation for a direction of gravity and have low inertia even when used in an articulated robot and the like.

A central plate 52 has a unidirectionally long member shape and includes a through hole 53 formed in the center thereof so that the rotating shaft 14 passes therethrough. The central plates 52 are disposed so as to form an acute angle with each other in a stopped state and are rotated to be appropriately perpendicular in an accelerated state. In this process, both ends of the brake links 50 are expanded. Further, the side plate 54 forms a rhombus shape in a stopped state and is rotated to form an appropriately square shape in an accelerated state.

Coupling holes 58 are formed in the side plates 54 to couple the side plates 54 formed at the front side and the rear side, and both ends of a coupling piece 60 are coupled to the coupling holes 58, and thus the side plates 54 are coupled to each other.

Meanwhile, adjusting members 70 are coupled at both sides of the central member 30. The elastic members 72 are provided on surfaces facing the adjusting members 70 disposed on both sides of the central member 30. The elastic member 72 is fitted onto an adjusting screw 74 passing through the adjusting member 70. Thus, while one end of the elastic member 72 is supported in the supporting groove 32 and the other end thereof is supported by the adjusting member 70, the elastic member 72 provides an elastic force so that expanded both ends of the brake links 50 are contracted. That is, the elastic member 72 provides an elastic force so that the brake links 50 returns to a stopped state. A compression spring may be used as the elastic member 72 to provide an elastic force to return to an original state from a compressed state.

According to the adjusting member 70 having the above structure, the elastic force of the elastic member 72 is adjusted through simple adjustment of fastening or unfastening the adjusting screw 74 as desired, and thus a braking velocity can be easily controlled to be a braking velocity desired by a user. The adjusting screws 74 are provided at both sides of the adjusting member 70, and thus the user has to equally adjust both sides of the adjusting screw 74 when adjusting the elastic member 72.

Hereinafter a process of operating the non-powered passive braking device using a centrifugal force according to the embodiment of the present invention will be described in detail.

Figure 3:
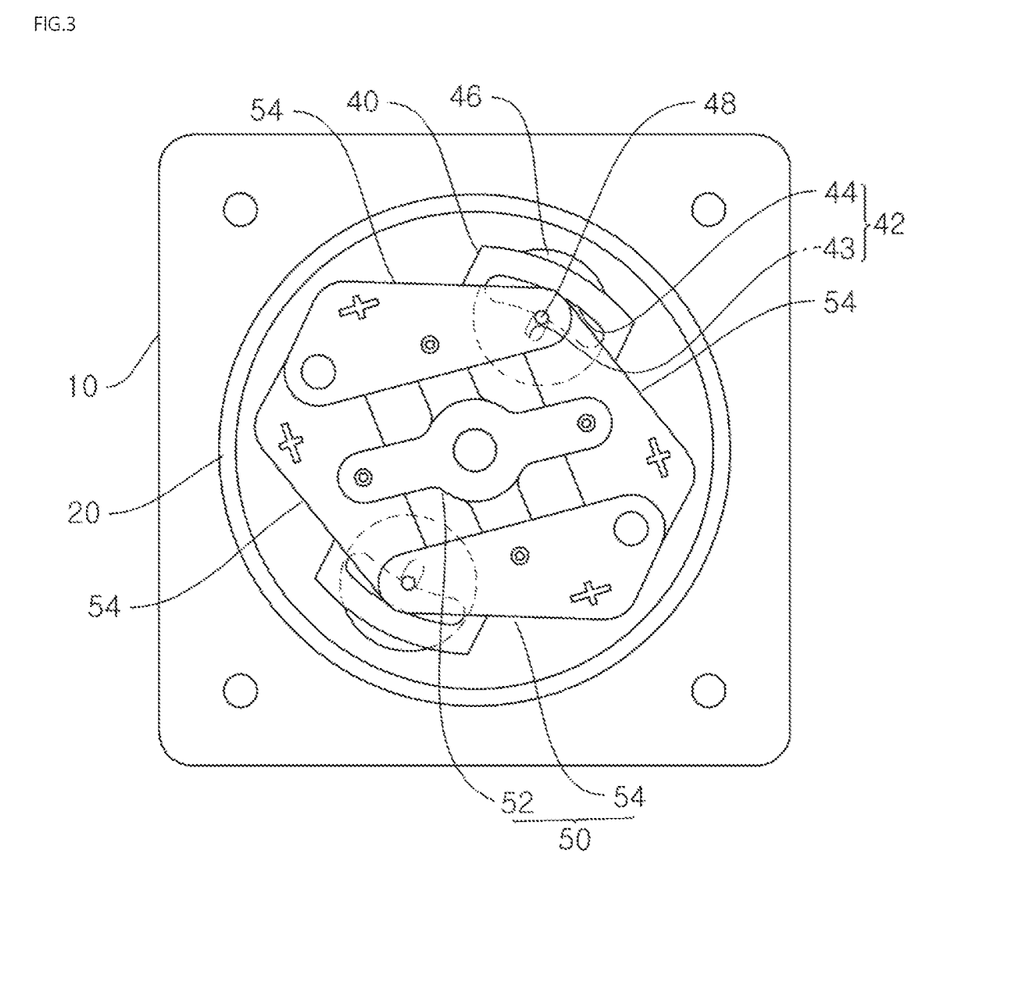
FIGS. 3 to 5 are operation state views showing braking torque generating when the non-powered passive braking device using a centrifugal force is accelerated according to one embodiment of the present invention.
Figure 4:
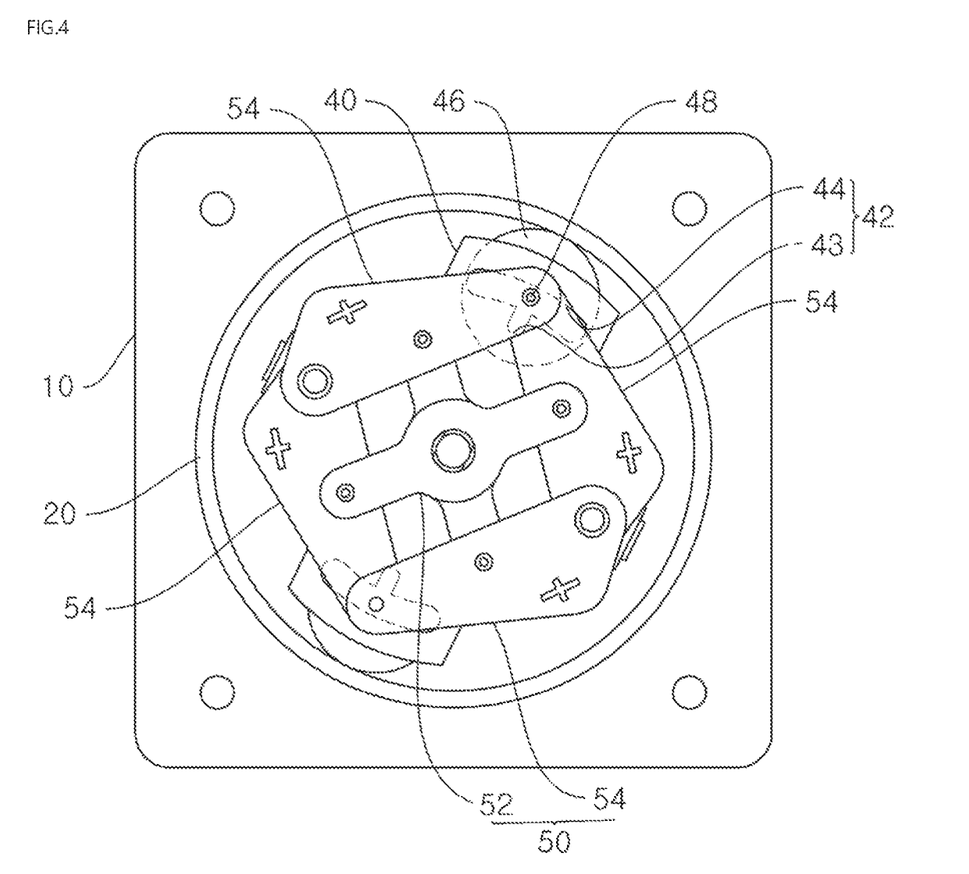
Figure 5:
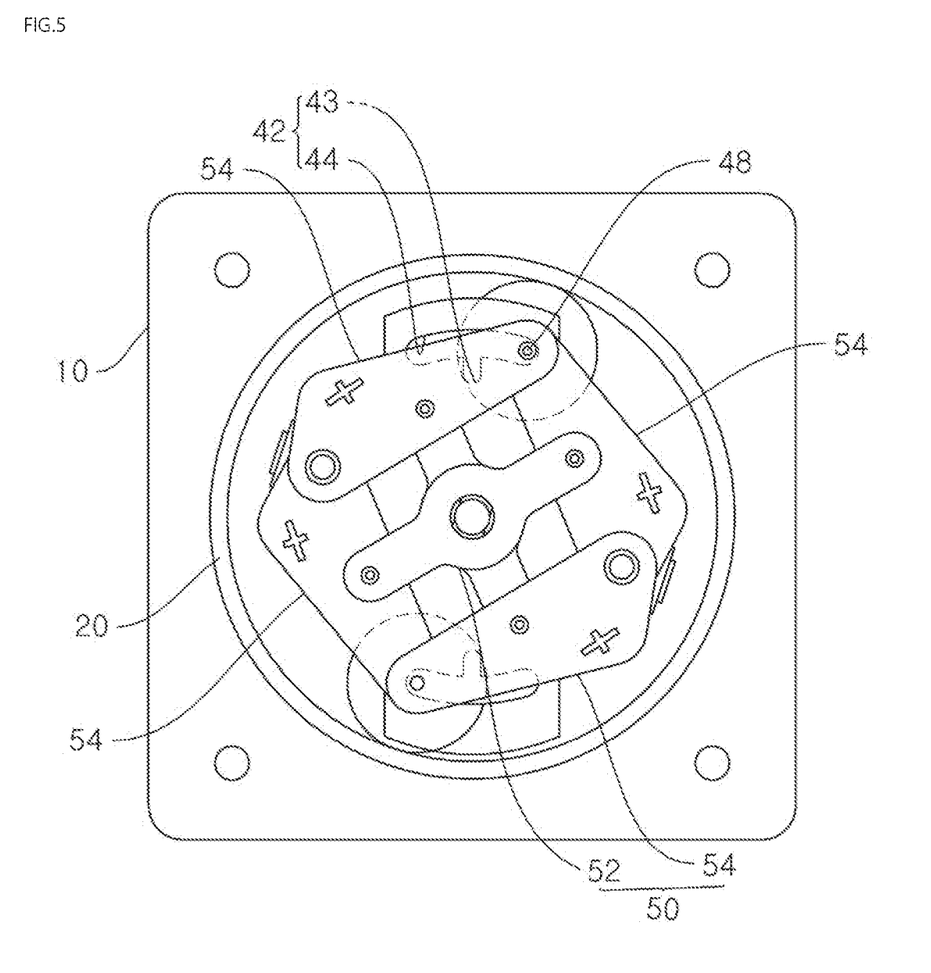

FIGS. 3 to 5 are operation state views showing braking torque generating when the non-powered passive braking device using a centrifugal force according to one embodiment of the present invention is accelerated.

As shown in FIGS. 3 to 5, when the non-powered passive braking device using the centrifugal force is in the stopped state, the roller shaft 48 is maintained in a state of being in close contact with an end of the initial part 43 of the braking slot 42. In this state, when a motor is driven, acceleration is gradually increased and, as shown in FIG. 3, the roller shaft 48 moves along the initial part 43.

Next, when the velocity reaches a braking velocity after the acceleration, as shown in FIG. 4, the roller shaft 48 escapes from the initial part 43 to move to the braking part 44. In this case, the roller shaft 48 comes into close contact with an inner wall of the brake drum 20, and braking starts.

Finally, when the roller shaft 48 comes into close with one end of the braking part 44, braking torque is applied so that the brake links 50 are not rotated. Thus, the brake links 50 stop and are prevented from being operated at a velocity greater than or equal to a braking velocity.

Figure 6:
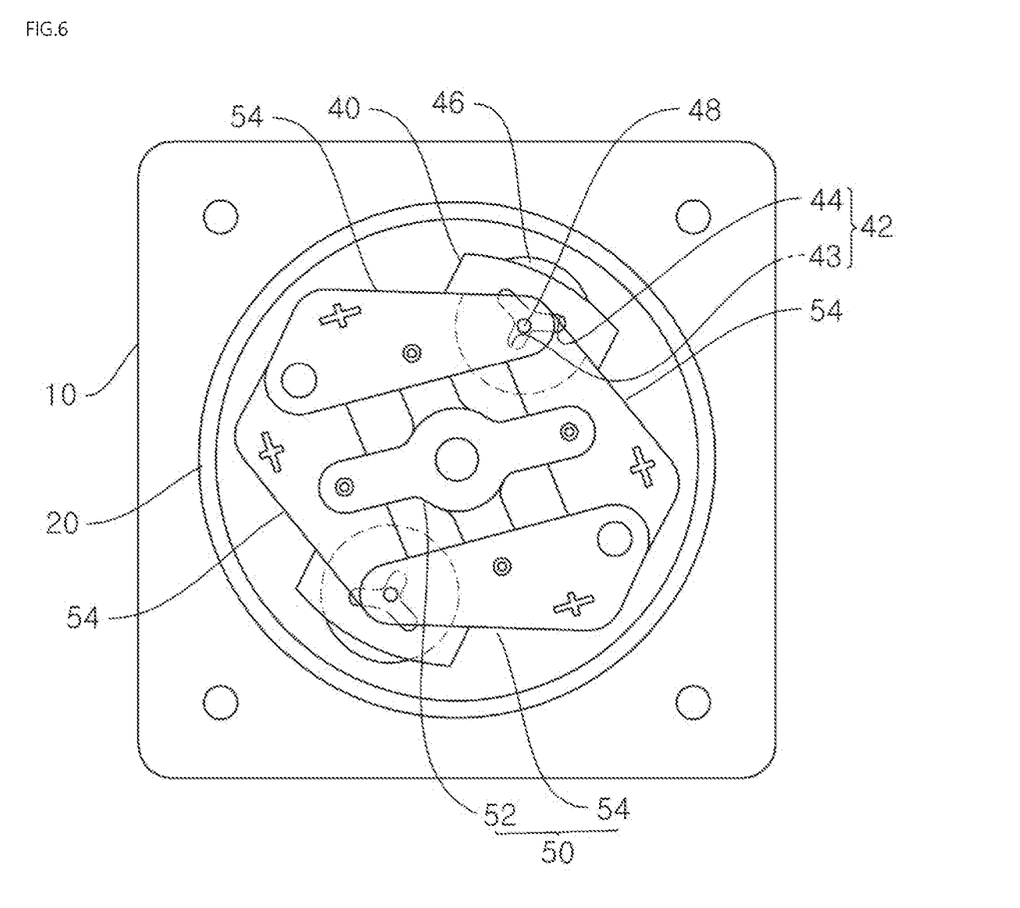
FIG. 6 is a view showing a non-powered passive braking device using a centrifugal force according to another embodiment of the present invention.

FIG. 6 is a view showing a non-powered passive braking device using a centrifugal force according to another embodiment of the present invention. The present embodiment is similar to the above-described embodiment in most configurations but has a slight difference in a configuration of the braking slot 42, and the difference will be mainly described.

In the present embodiment, the braking slot 42 may include the initial part 43 in which the roller shaft is positioned when acceleration starts in a stopped state, and the braking part 44 extending obliquely from a perpendicular axis of the initial part 43 and communicating therewith and allowing the roller shaft 48 to be locked at one side thereof when the velocity reaches the braking velocity.

Unlike the above description, in the braking slot 42, the braking part 44 extends obliquely from a perpendicular axis of the initial part 43 rather than extending perpendicular to the initial part 43. The extension of the braking part 44 allows the roller shaft 48 to more smoothly move to the braking part 44 when moving in an outer direction while acceleration is performed. Further, when the braking part 44 extends obliquely, the roller shaft 48 more smoothly moves to the initial part 43 even when the roller shaft 48 is returned to an initial position.

Meanwhile, an inclination angle between the initial part 43 and the braking part 44 can be variously controlled according to braking conditions such as, for example, a reaction velocity, braking force/torque, bi-directional braking, and the like.

Hereinafter, an effect of the non-powered passive braking device using a centrifugal force according to the embodiment of the present invention will be described with reference to FIGS. 7 and 8.

Figure 7:
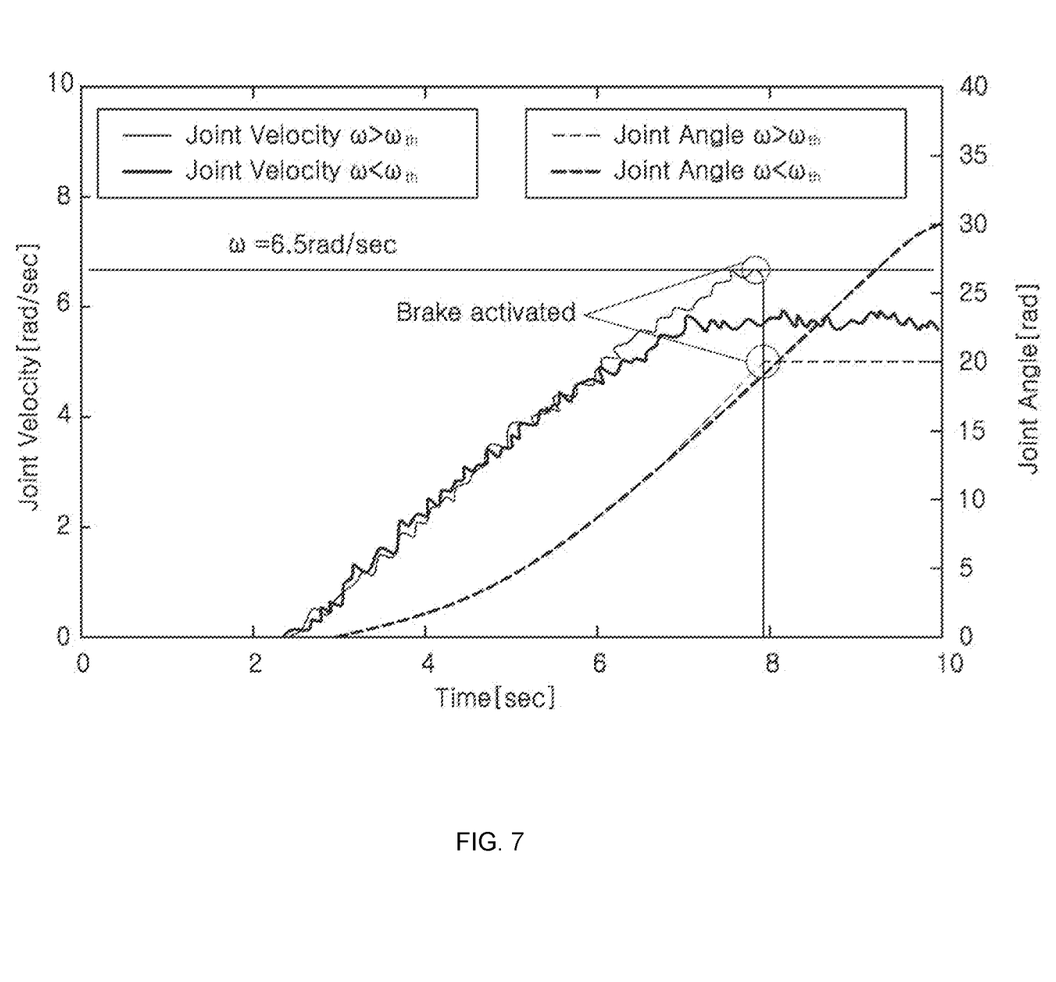
FIGS. 7 and 8 are graphs showing a state in which a braking velocity is controlled with respect to a joint angular velocity according to one embodiment of the present invention.

Referring to FIG. 7, a red line shows that, when a joint angular velocity is greater than a desired joint angular velocity $W_{th}$, the braking device is instantly operated at the desired joint angular velocity $W_{th}$ so that braking is activated. Further, a blue line shows that, when a joint angular velocity is less than the desired joint angular velocity $W_{th}$, the braking device is stably braked within a predetermined range at the joint angular velocity W or less.

Figure 8:
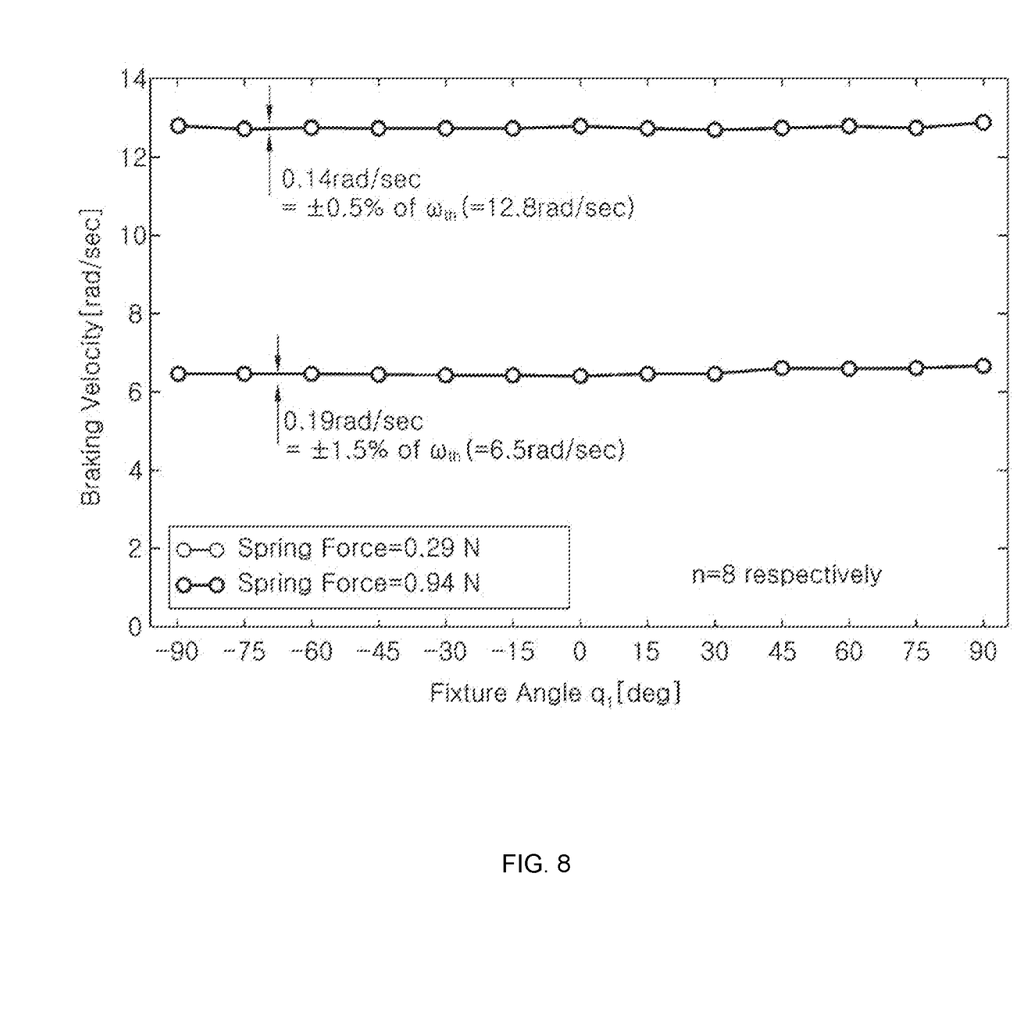

Referring to FIG. 8, the red line (a joint angular velocity of 0.14 rad/sec) and the blue line (a joint angular velocity of 0.19 rad/sec) have constant braking velocities with respect to the joint angle regardless of the joint angular velocity value. That is, according to the non-powered passive braking device using a centrifugal force, the braking velocity is constantly maintained at any joint angle without being affected by gravity.

While the present invention has been described with reference to the exemplary embodiments, it will be understood by those skilled in the art that various changes and modifications may be made without departing from the spirit and scope of the present invention as defined by the appended claims.

The invention claimed is:

1. A non-powered passive braking device using a centrifugal force, comprising:
   a housing;
   a brake drum mounted in the housing;
   a plurality of brake links rotatably mounted on a rotating shaft of the housing and connected with each other so that both ends thereof are expanded or contracted by centrifugal force;

brake rollers provided at both ends of the brake links and, when the brake links are expanded, coming into close contact with an inner wall of the brake drum so as to generate a braking force;

an elastic member configured to provide an elastic force so that expanded ends of the brake links are contracted;

a central member rotatably mounted on the rotating shaft of the housing; and brake plates respectively mounted at a front surface and a rear surface of the central member, wherein the brake rollers are rotatably provided between both ends of the brake plates.

2. The non-powered passive braking device of claim 1, wherein the brake links each include:

a pair of central plates mounted at an outer side of each of the brake plates and disposed to cross each other; and four side plates connected with both ends of the pair of central plates by link pins and having both ends rotatably connected with each other.

3. The non-powered passive braking device of claim 2, wherein the brake links are coupled with each other by coupling pieces having both ends coupled with the side plates.

4. The non-powered passive braking device of claim 1, wherein a roller shaft of the brake rollers moves along braking slots formed in both ends of the brake plates.

5. The non-powered passive braking device of claim 4, wherein the braking lots each have a T-shape and include:

an initial part in which the roller shaft is positioned when acceleration starts in a stopped state; and a braking part extending from the initial part in both directions and communicating therewith and allowing the roller shaft to be locked at one side thereof at a braking velocity.

6. The non-powered passive braking device of claim 4, wherein the braking slots each include:

an initial part in which the roller shaft is positioned when acceleration starts in a stopped state; and a braking part extending obliquely from a perpendicular axis of the initial part and communicating therewith and allowing the roller shaft to be locked at one side thereof at a braking velocity.

7. The non-powered passive braking device of claim 1, wherein the central member has adjusting members coupled to both sides thereof through adjusting screws, and the elastic member is fitted onto an outer surface of the adjusting screws so that elastic force of the elastic member is adjusted when the adjusting screws are adjusted.

8. The non-powered passive braking device of claim 7, wherein one end of the elastic member is supported in each of supporting grooves formed in both sides of the central member, and the other end thereof is supported by the adjusting members.

9. The non-powered passive braking device of claim 7, wherein the elastic member is provided as a compression spring to provide elastic force so that a compressed state is returned to an original state when both ends of the brake links are expanded.

\* \* \* \* \*